United States Patent
Yamashita et al.

(10) Patent No.: US 8,661,793 B2
(45) Date of Patent: Mar. 4, 2014

(54) CONSTRUCTION MACHINE

(75) Inventors: Koji Yamashita, Hiroshima (JP);
Masaaki Murakami, Hiroshima (JP);
Takayuki Okunishi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 111 days.

(21) Appl. No.: 13/496,709

(22) PCT Filed: Sep. 1, 2010

(86) PCT No.: PCT/JP2010/005389
§ 371 (c)(1),
(2), (4) Date: Mar. 16, 2012

(87) PCT Pub. No.: WO2011/033732
PCT Pub. Date: Mar. 24, 2011

(65) Prior Publication Data
US 2012/0174566 A1    Jul. 12, 2012

(30) Foreign Application Priority Data

Sep. 17, 2009 (JP) .................................. 2009-215275

(51) Int. Cl.
*F01N 3/00* (2006.01)
(52) U.S. Cl.
USPC .................................. 60/295; 60/286; 60/297
(58) Field of Classification Search
USPC .............. 60/286, 295, 297; 180/89.13, 89.17, 180/326, 327
See application file for complete search history.

(56) References Cited

U.S. PATENT DOCUMENTS

2010/0038162 A1    2/2010  Kamiya et al.
2010/0266458 A1 *  10/2010 Takeshita et al. ............. 422/109

FOREIGN PATENT DOCUMENTS

| JP | 11131527 A | * | 5/1999 |
| JP | 2003 20936 | | 1/2003 |
| JP | 2008 240676 | | 10/2008 |
| JP | 2009 62841 | | 3/2009 |
| JP | 2010 236208 | | 10/2010 |
| WO | 2009 001587 | | 12/2008 |

OTHER PUBLICATIONS

International Search Report issued on Nov. 16, 2010 in PCT/JP10/05389 filed on Sep. 1, 2010.

* cited by examiner

*Primary Examiner* — Thomas Denion
*Assistant Examiner* — Jason Shanske
(74) *Attorney, Agent, or Firm* — Oblon, Spivak, McClelland, Maier & Neustadt, L.L.P.

(57) ABSTRACT

A construction machine including an engine, a fuel tank, and a liquid reductant tank. The construction machine further includes a tank cover, and the fuel tank has an upper surface including a high-position surface and a low-position surface located at a lower position than the high-position surface and adjacent to the high-position surface through a step. The tank cover is provided over the low-position surface and at a height position approximately equal to that of the high-position surface to define a liquid reductant tank installation space in cooperation with the low-position surface. The liquid reductant tank has a replenishment port, installed in the liquid reductant tank installation space so that the replenishment port is close to a lower surface of the tank cover.

9 Claims, 3 Drawing Sheets

CONSTRUCTION MACHINE

TECHNICAL FIELD

The present invention relates to a construction machine equipped with a system for reducing and purifying nitrogen oxides (NOx) in exhaust gas using a liquid reductant.

BACKGROUND ART

As a construction machine equipped with an exhaust gas purifying system, there has been known a type which comprises a muffler provided with a reducing catalyst, and a liquid reductant tank for storing a liquid reductant, such as an aqueous urea solution, to be supplied to an upstream side of the reducing catalyst to accelerate a reduction reaction. In this type of construction machine, the liquid reductant, which is consumed at a rate proportional to consumption of fuel (e.g., several % of fuel) is generally replenished at the same timing as that of replenishment of fuel. Hence, for improvement of fuel and liquid reductant replenishment efficiency, it is desirable to install the liquid reductant tank closely to a fuel tank. Moreover, since quality and performance of the liquid reductant vary with temperature, it is desirable that the liquid reductant tank is installed in an environment almost free of influence of external heat, such as solar heat, engine heat and heat of ambient air, i.e., in a shielded environment.

Heretofore, for allowing the liquid reductant to be installed in the environment satisfying the above condition in a construction machine such as a hydraulic shovel, known is a technique of providing an openable and closable tool storage box close to a fuel tank disposed on an upper frame of an upper slewing body in the construction machine and arranging a liquid reductant tank within the tool storage box.

This conventional technique, however, has the following disadvantages A and B.

(A) A replenishment port of the liquid reductant tank is positioned at a position fairly lower than a filler port of the fuel tank, which complicates an operation of replenishing the liquid reductant from a replenishment tank, such as a plastic tank, to the liquid reductant tank. Specifically, the liquid reductant tank, required to have only a small capacity, has a significantly small size and a small height, as compared to the fuel tank. On the other hand, according to the above conventional technique, where the liquid reductant tank is installed within the toll storage box installed on the same plane as that of the fuel tank, the replenishment port of the liquid reductant tank inevitably becomes fairly lower than the filler port of the fuel tank. Using, as measures therefor, a special tank table to raise a height position of the replenishment port of the liquid reductant tank leads to significant increases in cost and required space.

(B) The technique involves a significant reduction in capacity of the fuel tank. The conventional technique requires enlarging a planar size of the tool storage box in order to house the liquid reductant tank therein, which inevitably leads to a reduction in planar size of the fuel tank to be disposed in side-by-side relation to the tool storage box within a limited space. Thus, the capacity of the fuel tank is significantly reduced, thereby shortening a time period in which a continuous construction work can be performed.

LIST OF PRIOR ART DOCUMENTS

[Patent Documents]
Patent Document 1: JP 2008-240676 A

SUMMARY OF THE INVENTION

It is an object of the present invention to provide a construction machine comprising a fuel tank for storing fuel to be supplied to an engine, and a liquid reductant tank for storing a liquid reductant for reducing and purifying nitrogen oxides in exhaust gas from the engine, and allowing the liquid reductant tank to be provided at a desired position without a significant increase in cost and required space, while a reduction in capacity of the fuel tank is suppressed. To achieve this object, the construction machine according to the present invention further comprises a tank cover for covering the liquid reductant tank, wherein the fuel tank has an upper surface including a high-position surface and a low-position surface located at a lower position than the high-position surface and adjacent to the high-position surface through a step, and wherein the tank cover defines a liquid reductant tank installation space in cooperation with the low-position surface by being disposed just above the low-position surface and at a height position approximately equal to that of the high-position surface. The liquid reductant tank has a replenishment port for replenishing the liquid reductant into the liquid reductant tank from outside thereof and is installed in the liquid reductant tank installation space so that the replenishment port is close to a lower surface of the tank cover.

DESCRIPTION OF EMBODIMENTS

There will be described below a first embodiment of the present invention based on FIGS. 1 to 5. The construction machine according to this embodiment is a shovel. However, the present invention is not limited to a shovel, but may be applied to various other construction machines, for example, dismantling and crushing machines each comprising a shovel body as a basic body and an appropriate attachment added thereto, as long as they are equipped with a system for reducing and purifying nitride oxides in exhaust gas using a liquid reductant.

(1) Basic Configuration of Shovel

Figure 1:
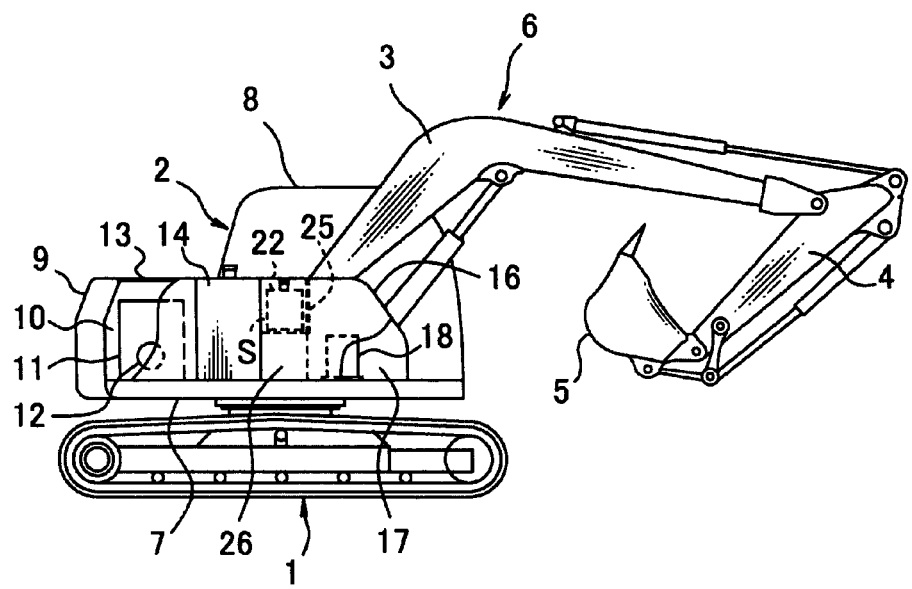
FIG. 1 is a partially cut-away, schematic, side view of a shovel according to a first embodiment of the present invention.
Figure 2:
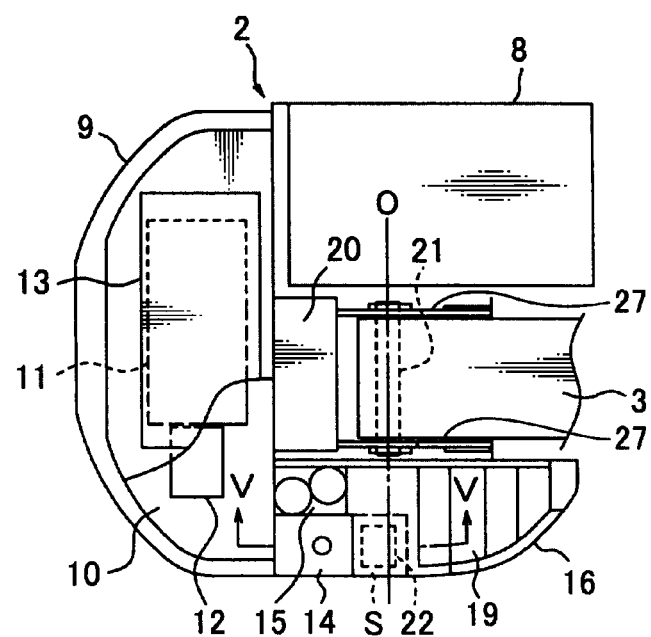
FIG. 2 is a partially cut-away, schematic, top plan view of the shovel.
Figure 3:
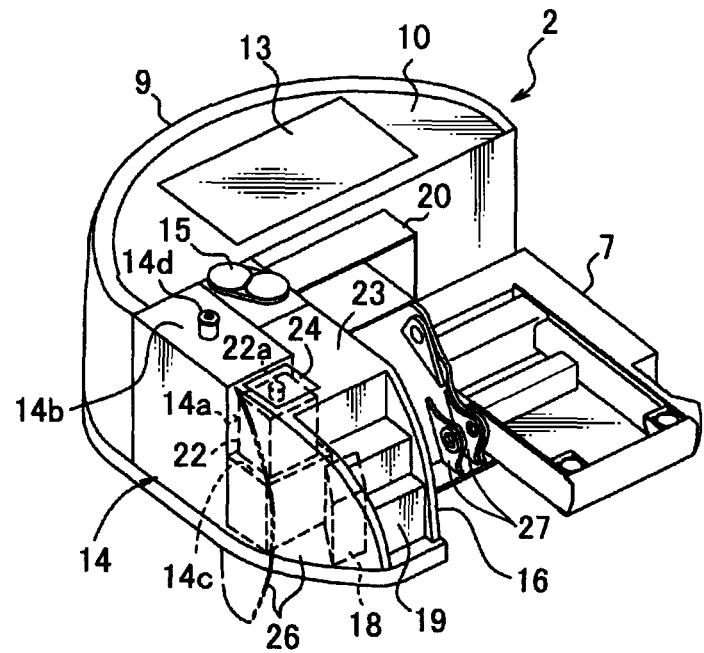
FIG. 3 is a perspective view of an upper slewing body of the shovel.
Figure 4:
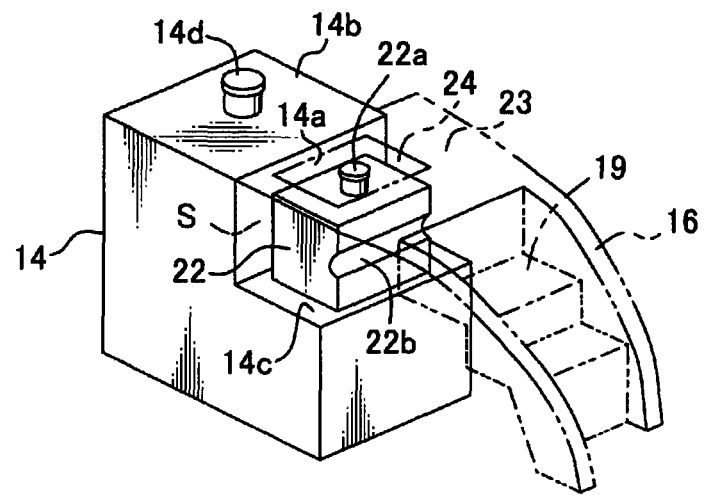
FIG. 4 is a perspective view of a fuel tank and a liquid reductant tank.

As illustrated in FIGS. 1 to 3, the shovel according to this embodiment comprises a crawler-type lower propelling body 1, an upper slewing body 2 mounted on the lower propelling body 1 slewably about a vertical axis perpendicular to the ground surface; and a work attachment 6 attached to a front portion of the upper slewing body 2. The work attachment 6 includes a boom 3, an arm 4 and a bucket 5.

The upper slewing body 2 includes an upper frame 7 serving as a base, a cabin 8 provided on a left side of a front region of the upper frame 7, and a counterweight 9 provided in a rear end region of the upper frame 7. An engine room 10 is formed in a rear portion of the upper slewing body 2, being disposed at a front side of the counterweight 9. In the engine room 10, installed are an engine 11 serving as a power source, and peripheral equipment of the engine, such as a hydraulic pump 12 and a non-illustrated heat exchanger. The engine 11 is oriented in a right-left direction (as used in this specification, the terms "front and rear" and "right and left" mean directions as viewed from an operator who is seated in the cabin 8). A bonnet 13 is provided just above the engine room 10 swingably, i.e., openably and closably, about a rear end thereof. Under a condition that the bonnet 13 is opened, maintenance for the engine 11 and others is performed from an upper side of the engine room.

At a right side of the upper slewing body 2, there are installed a fuel tank 14 and a hydraulic oil tank 15 at respective positions close to the engine room 10 so as to be arranged in the right-left direction. A front cover 16 (see FIGS. 1 and 5) is provided at a front side of the two tanks 14, 15 to cover an equipment compartment 17 from above, and a control valve 18 is provided in the equipment compartment 17 to control an operation of a hydraulic actuator. In other words, in the shovel according to this embodiment, the equipment compartment 17 is provided at a position frontward away from the engine room 10, and the fuel tank 14 is disposed between the equipment compartment 17 and the engine room 10.

The front cover 16 has an upper surface, which is integrally formed with a staircase 19 obliquely rising toward the bonnet 13. This staircase 19 allows an operator to climb up the staircase 19 from a front side of the shovel to access a region just above the engine room 10 to perform an opening/closing operation of the bonnet 13 and a maintenance operation. An exhaust air duct 20 (see FIGS. 2 and 3) is provided at a front side of an approximately central region of the engine room 10. This exhaust air duct 20 protrudes frontward to release high-temperature air in the engine room 10 to the outside, having an upper surface which also serves as a foothold during the maintenance operation.

Figure 5:
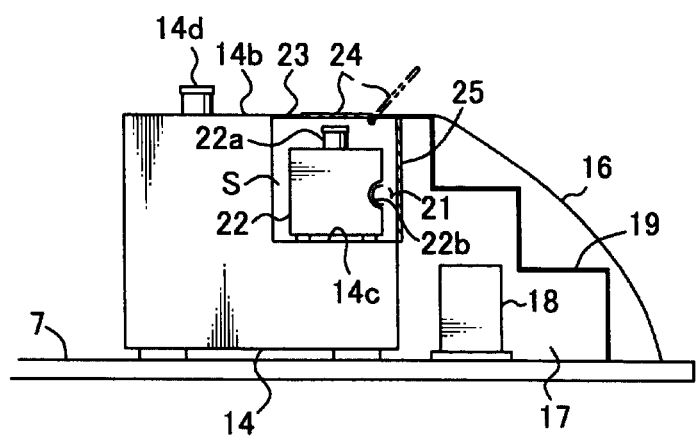
FIG. 5 is a sectional view taken along the line V-V in FIG. 2.

The construction machine according to this embodiment further comprises a boom foot pin 21 (see FIGS. 2 and 5). This boom foot pin 21 is adapted to couple a base end of the boom 3 constituting the work attachment 6 to the upper slewing body 2 at a front side of the exhaust air duct 20; in this coupled state, the boom 3 is raised and lowered so as to be swingably moved about the boom foot pin 21. Specifically, the upper slewing body 2 is provided with a boom support section, which is constituted by a pair of boom support plates 27 installed upright so as to sandwich the base end of the boom 3 therebetween in the right-left direction. The boom foot pin 21 is removably inserted into the boom support plates 27 and the base end of the boom 3, in an axial direction of the boom foot pin 21, along a boom foot pin insertion and removal line corresponding to an axis O (see FIG. 2) of the boom foot pin 21, thereby permitting the boom 3 to be detached and attached.

(2) Liquid Reductant Tank 22 and Installation thereof

The fuel tank 14 has an upper surface including a high-position surface 14b and a low-position surface 14c located at a lower position than the high-position surface 14b. The surfaces 14b, 14c are located adjacent to each other through a step 14a. The high-position surface 14b forms an upper surface of a rear half region of the fuel tank 14 on the side of the engine room 10, while the low-position surface 14c forms an upper surface of a front half region which is a region located at a front side of the rear half region. In other words, the upper surface of the fuel tank 14 has an L shape in which the high-position surface 14b and the low-position surface 14c are continued to each other through the step 14a in a front-rear direction in a staircase pattern. The high-position surface 14b is provided with a filler port 14d for filling the fuel tank 14 with fuel from the outside thereof.

The construction machine according to this embodiment further comprises a tank cover 23 to be attached to the fuel tank 14. This tank cover 23 is provided just above the low-position surface 14c and at a height position approximately equal to that of (i.e., absolutely equal to that of, or slightly offset upwardly or downwardly with respect to) the high-position surface 14b to define a liquid reductant tank installation space S between the tank cover 23 and the low-position surface 14c.

A liquid reductant tank 22 has a replenishment port 22a for replenishing the liquid reductant from the outside thereof into the liquid reductant tank 22. The replenishment port 22a is provided in an upper surface portion of the liquid reductant tank 22. The liquid reductant tank 22 is installed in the liquid reductant tank installation space S in a posture where the replenishment port 22a is located close to a lower surface of the tank cover 23, i.e., the replenishment port 22a is located at a height position lower than but close to that of the filling port 14b of the fuel tank 14.

In this embodiment, the tank cover 23 is integrally formed with the front cover 16 to form a single-piece cover member. Specifically, the tank cover 23 is continued to a top of the staircase 19 formed on the front cover 16. The tank cover 23 is provided with a lid 24. Specifically, a portion of the tank cover 23 located just above the liquid reductant tank 22 forms the lid 24. The lid 24 is attached to a remaining portion of the tank cover 23 in such a manner as to be openable and closable, specifically, swingably moved about a front end thereof. Under a condition that the lid 24 is opened, the liquid reductant is allowed to be replenished in the liquid reductant tank 22.

The construction machine according to this embodiment further comprises a heat shield plate 25 as a heat shield member. This heat shield plate 25 is disposed between the liquid reductant tank 22 and the control valve 18 to prevent heat generated by the control valve 18 from being transferred to the liquid reductant tank 22. The heat shield plate 25 in this embodiment extends downwardly from a lower surface of the top of the front cover 16 to cover the liquid reductant tank 22 from the side of a front surface of liquid reductant tank 22.

As illustrated in FIGS. 2 and 5, the liquid reductant tank installation space S according to this embodiment is located at such a position that the boom foot pin insertion and removal line corresponding to the axis O of the boom foot pin 21 extending in a width (lateral) direction of the upper slewing body 2, i.e., a line along which the boom foot pin 21 are to be removably inserted into the base end of the boom 3 and the boom support section (the pair of boom support members 27) passes through the space S. A front portion of the liquid reductant tank 22 installed in the liquid reductant tank installation space S is provided with a cutout 22b, which has a shape capable of preventing the liquid reductant tank 22 and the boom foot pin 21 to be inserted and removed along the boom foot pin insertion and removal line O from interfering with each other.

An openable and closable side cover 26 is provided on a right side of the equipment compartment 17 (see FIGS. 1 and 3), covering a front half region of the fuel tank 14, a right side surface of the liquid reductant tank 22, and a right side surface of the control valve 18, from a lateral side.

As described above, in this embodiment, the upper surface of the fuel tank includes the high-position surface 14b and the low-position surface 14c adjacent to each other through the step 14a; the tank cover 23 is provided just above the low-position surface 14c and at a height position approximately equal to that of the high-position surface 14b to define the liquid reductant tank installation space S between the tank cover 23 and the low-position surface 14c; and the liquid reductant tank 22 is installed in the liquid reductant tank installation space S. Thus, the liquid reductant tank 22 is installed in a shielded environment where it is covered from above with the tank cover 23 to be hardly influenced by external heat. In addition, placing the liquid reductant tank 22 on the low-position surface 14c directly with no use of a special tank table enables the height position of the replenishment port 22a of the liquid reductant tank 22 to be closer to the height position of the filler port 14d of the fuel tank 14. Besides, since the fuel tank 14 can be remained in a region beneath the low-position surface 14c on which the liquid reductant tank 22 is installed, larger capacity of the fuel tank 14 can be given as compared with, for example, the case where the fuel tank 14 is fully cut from top to bottom in an installation area of the liquid reductant tank 22, i.e., the case where the fuel tank 14 is not installed in the installation area.

Consequently, the shovel according to this embodiment allows the liquid reductant tank 22 to be installed in a shielded environment free of influence of external heat and in a state capable of facilitating the replenishment, while suppressing a reduction in capacity of the fuel tank 14 and not requiring a special height-raising tank table.

This embodiment, in addition, provides the following advantageous effects.

(i) Since the upper surface of the fuel tank 14 has a shape including the high-position surface 14b and the low-position surface 14c which are continued to each other in a staircase pattern in side view (e.g., an L shape), the liquid reductant tank 22 can be carried into and carried out of the liquid reductant tank installation space S in a plurality of directions. This facilitates the operation of carrying-in and carrying-out the liquid reductant tank 22 for inside cleaning thereof.

(ii) Since the low-position surface 14c of the fuel tank 14 exists at a front side of the high-position surface 14b, the liquid reductant tank 22 installed on the low-position surface 14c is located on a side opposite to the engine room 10 across a portion of the fuel tank 14 where the high-position surface 14b is an upper surface thereof (a rear half portion of the fuel tank 14). Hence, the portion where the high-position surface 14b is an upper surface thereof can suppress heat transfer from the engine room 10 to the liquid reductant tank 22, thereby contributing to a suppressed temperature rise of the liquid reductant due to heat in the engine room 10.

(iii) The lid 24 provided in the tank cover 23 can eliminate the need for attaching and detaching the entire tank cover 23 (in this embodiment, the entire front cover 16 integrally formed with the tank cover 23) for replenishment of the liquid reductant, thereby facilitating the replenishment of the liquid reductant.

(iv) The heat shield plate 25 can obstruct heat transfer from the control valve 18 for controlling the operation of the hydraulic actuator, to the liquid reductant tank 22, thereby suppressing a temperature rise of the liquid reductant due to heat generated by the control valve 18, despite the adjacent relationship between the control valve 18 and the liquid reductant tank 22.

(v) The tank cover 23, integrally formed with the front cover 16 covering an upper region of the equipment compartment 17 to form a single-piece cover member, can possess more simplified structure and be easily assembled in lower cost, as compared with the case where the tank cover 23 is formed of a special member separate from the front cover 16. Particularly, the tank cover 23 in this embodiment, which is continued to the top of the staircase 19 formed on the front cover 16, cannot cause a trouble of hindering climbing-up and climbing-down or making a gap between the tank cover 23 and the top of the staircase 19.

(vi) Since the liquid reductant tank installation space S is located at such a position that the boom foot pin insertion and removal line corresponding to the axis O of the boom foot pin 21, i.e., a line along which the boom foot pin is inserted and removed axially, passes through the space S, the boom foot pin 21 can be inserted and removed via a route passing through the liquid reductant tank installation space S. In other words, the liquid reductant tank installation space S additionally serves as a pin insertion and removal space to allow the boom foot pin 21 to be inserted and removed; this eliminates the need for separately dedicating an independent space for pin insertion and removal, thus allowing larger space for arranging various equipment to be dedicated. Furthermore, the cutout 22b formed in the front surface portion of the liquid reductant tank 22 allows the boom foot pin 21 to be inserted and removed, with little reduction in a capacity of the liquid reductant tank 22, with no need for displacement of the liquid reductant tank 22, and with no interference between the liquid reductant tank 22 and the boom foot pin 21. Even without the cutout 22b, the liquid reductant tank 22, which is small and lightweight as compared with the fuel tank 14 enough to be relatively easily displaced, can be shifted to a position free of interference with the insertion and removal of the boom foot pin 21.

Figure 6:
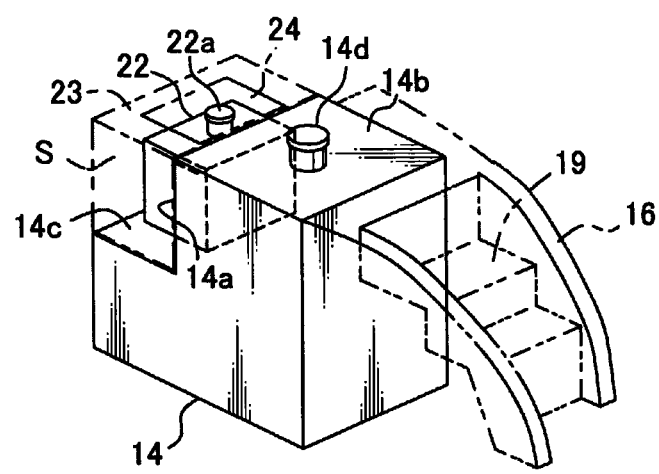
FIG. 6 is a perspective view of a fuel tank and a liquid reductant tank in a second embodiment of the present invention.
Figure 7:
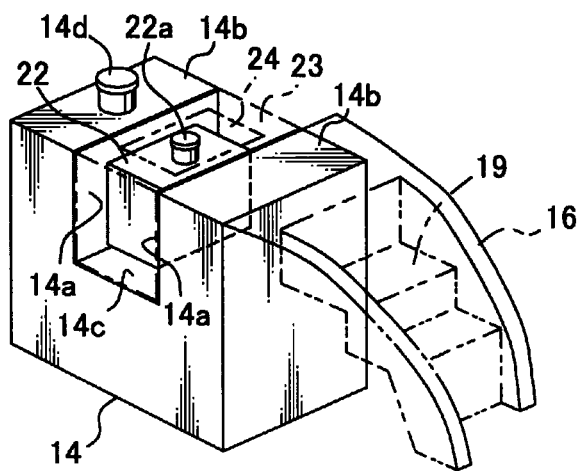
FIG. 7 is a perspective view of a fuel tank and a liquid reductant tank in a third embodiment of the present invention.

The concrete shape of the liquid reductant tank is not limited to the aforementioned one. For example, like a liquid reductant tank 22 shown in FIG. 6 as a second embodiment of the present invention, the shape may be one reversed in the front-rear direction with respect to the shape of the liquid reductant tank 22 in the first embodiment, i.e., a shape in which the high-position surface 14b is located at a front side while the low-position surface 14c is located at a rear side. In other words, the shape may be an L shape when viewed from a left side surface thereof. Alternatively, like a liquid reductant tank 22 shown in FIG. 7 as a third embodiment of the present invention, the shape may be one in which a central region of an upper surface in the front-rear direction is concaved, i.e., a shape in which two high-position surfaces 14b, 14b are located on front and rear end regions thereof, respectively, and a low-position surface 14c is located in a central region between the high-position surfaces 14b, 14b, wherein two steps 14a, 14a are interposed between the low-position surface 14c and one of the high-position surfaces 14b, 14b and between the low-position surface 14c and the other high-position surface 14b, respectively. In the second and third embodiments, suitable is that the tank cover 23 be formed as a member independent from the front cover 16 and provided so as to cover the liquid reductant tank 22 from above or, as shown in FIGS. 6 and 7, from above and from the side of a right side surface of the liquid reductant tank 22.

As described above, the present invention provides a construction machine which comprises an engine, a fuel tank for storing fuel to be supplied to the engine, and a liquid reductant tank for storing a liquid reductant for reducing and purifying nitrogen oxides in exhaust gas from the engine, and is adapted to allow the liquid reductant tank to be installed at a desirable position without a significant increase in cost and required space, while suppressing a reduction in capacity of the fuel tank. Specifically, the construction machine of the present invention further comprises a tank cover to cover the liquid reductant tank, the fuel tank having an upper surface including a high-position surface and a low-position surface located at a lower position than the high-position surface and adjacent to the high-position surface through a step, the tank cover being provided just above the low-position surface and at a height position approximately equal to that of the high-position surface to define a liquid reductant tank installation space between the tank cover and the low-position surface. The liquid reductant tank has a replenishment port for replenishing the liquid reductant from an outside thereof into the liquid reductant tank, and is installed in the liquid reductant tank installation space in such a posture that the replenishment port is close to a lower surface of the tank cover.

In the construction machine of the present invention, the liquid reductant tank can be installed in an environment where it is covered with the tank cover to be shielded from the outside thereof and hardly influenced by external heat. In addition, installing the liquid reductant tank on the low-position surface of the fuel tank enables the height position of the replenishment port of the liquid reductant tank to be closer to the height position of the filler port of the fuel tank, even with no use of a special tank table. Besides, since the fuel tank can be remained in a region beneath the low-position surface, the reduction in capacity of the fuel tank due to installation of the liquid reductant tank can be suppressed as compared with, for example, the case where no fuel tank is installed in an installation area of the liquid reductant tank, i.e., the fuel tank is fully cut from top to bottom in the installation area. In summary, the construction machine of the present invention allows the liquid reductant tank to be installed in a shielded environment with little influence by external heat, in a state capable of facilitating the replenishment, with no need for a special height-raising tank table, while suppressing a reduction in capacity of the fuel tank.

As to a concrete shape of the upper surface of the fuel tank, suitable is a shape where the high-position surface and the low-position surface are continued to each other through the step in a staircase pattern. This shape allows the liquid reductant tank to be carried in and carried out of the liquid reductant tank installation space defined above the low-position surface of the fuel tank, in a plurality of directions, thereby facilitating the operation of carrying-in and carrying-out of the liquid reductant tank for cleaning the inside of the liquid reductant tank.

The tank cover is, preferably, provided with an openable and closable lid so as to allow the liquid reductant to be replenished into the liquid reductant tank from the outside of the tank cover. The lid eliminates the need for attaching and detaching the entire tank cover to replenish the liquid reductant, thereby facilitating the replenishment of the liquid reductant.

The construction machine of the present invention may further comprise a control valve adapted to control an operation of a hydraulic actuator. In this case, providing the control valve closely to the liquid reductant tank permits the entire construction machine to be downsized. Furthermore, the construction machine may be provided with a heat shield member to obstruct heat transfer from the control valve to the liquid reductant tank between the liquid reductant tank and the control valve, which makes it possible to suppress a temperature rise of the liquid reductant due to heat generated by the control valve, despite the above adjacent relationship.

The present invention is suitably applied to a construction machine which comprises a lower propelling body and an upper slewing body slewably mounted on the lower propelling body, wherein the engine, the fuel tank and the liquid reductant tank are mounted on the upper slewing body. In this type of construction machine, it is preferable that the upper slewing body is provided with an engine room to house the engine at a rear thereof and the fuel tank is provided on one of right and left sides of a region at a front side of the engine room such that the low-position surface of the fuel tank is located on a front side of the high-position surface of the fuel tank. In this construction machine, a portion of the fuel tank where the high-position surface is an upper surface thereof is interposed between the liquid reductant tank and the engine room, thus obstructing heat transfer from the engine room to the liquid reductant tank.

Besides, it is also preferable that the above construction machine further comprises a front cover which covers an equipment compartment at a position frontward away from the engine room, wherein: the fuel tank is provided between the equipment compartment and the engine room and close to the engine room; the liquid reductant tank is provided between the fuel tank and the equipment compartment; and the tank cover covering the liquid reductant tank is integrated with the front cover to form a single-piece cover member. Thus forming the tank cover covering the liquid reductant integrally with the front cover decreases the number of total components of the construction machine and facilitates an assembling operation, resulting in reduced cost.

In this case, more preferable is that the above construction machine further comprises a bonnet provided just above the engine room openably and closeably, wherein the front cover has an upper surface formed with a staircase obliquely rising from a front end region of the upper slewing body toward the bonnet, and the tank cover is continued to a top of the staircase. In this construction machine, though the staircase and the tank cover are adjacent to each other, it is possible to avoid a trouble that the tank cover hinders an operator from climbing up and climbing down the staircase, or that a gap is formed between the tank cover and the staircase.

As to the construction machine further comprising: a work attachment including a boom and mounted to the upper slewing body in a raisable and lowerable manner; and a boom foot pin adapted to be removably inserted into a base end of the boom and a boom support section provided in the upper slewing body to couple the base end of the boom and the boom support section together swingably in a rising and lowering direction of the boom, and, in the coupling state, serve as a swing support point of the boom, it is preferable that the liquid reductant tank installation space is defined at such a position that a boom foot pin insertion and removal line, that is, a line along which the insertion and removal of the boom foot pin are performed, passes through the liquid reductant tank installation space. In this construction machine, since the boom foot pin is inserted and removed via a route passing through the liquid reductant tank installation space, in other words, the liquid reductant tank installation space additionally serves as a pin insertion and removal space to allow the boom foot pin to be inserted and removed, larger space for arranging various equipment can be dedicated, as compared with the case of forming a pin insertion and removal space independent from the liquid reductant tank installation space. In this case, the small and lightweight liquid reductant tank, can be easily shifted, when interfering with the insertion and removal of the boom foot pin. Alternatively, the liquid reductant tank may be provided with a cutout for preventing the liquid reductant tank and the boom foot pin inserted or removed from interfere with each other.

What is claimed is:
1. A construction machine having an exhaust gas purifying function, comprising:
an engine;
a fuel tank for storing fuel to be supplied to the engine;

a liquid reductant tank for storing a liquid reductant for reducing and purifying nitrogen oxides in exhaust gas from the engine; and a tank cover for covering the liquid reductant tank, wherein: the fuel tank has an upper surface which includes a high-position surface and a low-position surface located at a lower position than the high-position surface and adjacent to the high-position surface through a step; the tank cover is provided just above the low-position surface and at a height position approximately equal to that of the high-position surface to define a liquid reductant tank installation space between the tank cover and the low-position surface; and the liquid reductant tank has a replenishment port for replenishing the liquid reductant from outside thereof to the liquid reductant tank, and is installed in the liquid reductant tank installation space in such a posture that the replenishment port is close to a lower surface of the tank cover.

2. The construction machine as defined in claim 1, wherein the high-position surface and the low-position surface is continued to each other through the step in a staircase pattern.

3. The construction machine as defined in claim 1, wherein the tank cover is provided with an openable and closable lid to allow the liquid reductant to be replenished into the liquid reductant tank from the outside of the tank cover.

4. The construction machine as defined in claim 1, further comprising: a control valve provided at a position close to the liquid reductant tank and adapted to control an operation of a hydraulic actuator; and a heat shield member provided between the control valve and the liquid reductant tank to obstruct heat transfer from the control valve to the liquid reductant tank.

5. The construction machine as defined in claim 1, comprising a lower propelling body and an upper slewing body slewably mounted on the lower propelling body, wherein the engine, the fuel tank and the liquid reductant tank are mounted on the upper slewing body.

6. The construction machine as defined in claim 5, wherein the upper slewing body is provided with an engine room at a rear portion thereof to house the engine, and the fuel tank is provided on one of right and left sides of a region at a front side of the engine room, in such a posture that the low-position surface of the fuel tank is located on a front side of the high-position surface of the fuel tank.

7. The construction machine as defined in claim 6, further comprising a front cover which covers an equipment compartment at a position frontward away from the engine room, wherein: the fuel tank is provided between the equipment compartment and the engine room and close to the engine room; the liquid reductant tank is provided between the fuel tank and the equipment compartment; and the tank cover covering the liquid reductant tank is integrated with the front cover to form a single-piece cover member.

8. The construction machine as defined in claim 7, further comprising a bonnet provided just above the engine room in an openable and closeable manner, wherein the front cover has an upper surface formed with a staircase obliquely rising from a front end region of the upper slewing body toward the bonnet, and the tank cover is continued to a top of the staircase.

9. The construction machine as defined in claim 5, further comprising:

a work attachment including a boom and mounted to the upper slewing body in a raisable and lowerable manner; and a boom foot pin adapted to be removably inserted into a base end of the boom and a boom support section provided in the upper slewing body to couple the base end of the boom and the boom support section together swingably in a rising and lowering direction of the boom and, in the coupling state, serve as a swing support point of the boom, wherein the liquid reductant tank installation space is defined in such a position that a boom foot pin insertion and removal line along which the insertion and removal of the boom foot pin are performed passes through the liquid reductant tank installation space.

\* \* \* \* \*